United States Patent
Wang et al.

(10) Patent No.: US 9,932,469 B2
(45) Date of Patent: *Apr. 3, 2018

(54) HETEROPHASIC POLYPROPYLENE POLYMER

(71) Applicant: BOREALIS AG, Vienna (AT)

(72) Inventors: Jingbo Wang, Linz (AT); Petar Doshev, Linz (AT); Luigi Resconi, Ferrara (IT); Wilfried Toltsch, Marchtrenk (AT)

(73) Assignee: Borealis, AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/109,855

(22) PCT Filed: Jan. 6, 2015

(86) PCT No.: PCT/EP2015/050114
§ 371 (c)(1),
(2) Date: Jul. 6, 2016

(87) PCT Pub. No.: WO2015/104266
PCT Pub. Date: Jul. 16, 2015

(65) Prior Publication Data
US 2016/0333175 A1  Nov. 17, 2016

(30) Foreign Application Priority Data
Jan. 7, 2014 (EP) .................................... 14150318

(51) Int. Cl.
C08L 23/00 (2006.01)
C08L 23/14 (2006.01)
C08F 210/06 (2006.01)
C08J 5/18 (2006.01)

(52) U.S. Cl.
CPC .......... C08L 23/142 (2013.01); C08F 210/06 (2013.01); C08J 5/18 (2013.01); *C08J 2323/16* (2013.01); *C08J 2423/16* (2013.01)

(58) Field of Classification Search
CPC ....... C08L 23/142; C08J 5/18; C08J 2423/16; C08J 2323/16; C08F 210/06; C08F 2/001; C08F 110/06; C08F 2500/03; C08F 2500/12; C08F 2500/17; C08F 2500/20; C08F 210/16

See application file for complete search history.

(56) References Cited

U.S. PATENT DOCUMENTS

2017/0137617 A1* 5/2017 Wang et al. ............ C08L 23/14
2017/0145199 A1* 5/2017 Wang et al. ............ C08L 23/14

FOREIGN PATENT DOCUMENTS

| EP | 1511803 | 9/2007 |
|---|---|---|
| EP | 2053086 | 4/2009 |
| WO | 2003051934 | 6/2003 |
| WO | 2004011507 | 2/2004 |
| WO | 2006097497 | 9/2006 |
| WO | 2007116034 | 10/2007 |
| WO | 2009054832 | 4/2009 |
| WO | 2009077032 | 6/2009 |
| WO | 2009077034 | 6/2009 |
| WO | 2011135004 | 11/2011 |
| WO | 2011135005 | 11/2011 |
| WO | 2012028252 | 3/2012 |
| WO | 2013007650 | 1/2013 |
| WO | 2013007664 | 1/2013 |
| WO | 2015004251 | 1/2015 |
| WO | 2015104266 | 7/2015 |

OTHER PUBLICATIONS

International Search Report for PCT/EP2015/050114 dated Mar. 12, 2015.

* cited by examiner

*Primary Examiner* — Nathan M Nutter
(74) *Attorney, Agent, or Firm* — Gardner Groff Greenwald & Villanueva, PC

(57) ABSTRACT

A heterophasic propylene ethylene copolymer having an $MFR_2$ of 0.5 to 100 g/10 m in and obtained using single site catalysis comprising: (i) a propylene homopolymer or propylene ethylene copolymer matrix having up to 4 wt % ethylene; and (ii) an ethylene propylene rubber (EPR) dispersed in the matrix; said heterophasic propylene ethylene copolymer having a xylene cold soluble content (XS) of 20 to 40%; wherein the ethylene content of the xylene cold soluble fraction of said heterophasic propylene ethylene copolymer is between 70 and 90 wt. %; wherein the xylene cold soluble fraction of said heterophasic propylene ethylene copolymer has an intrinsic viscosity (IV) of 3.0 dl/g or more; and wherein the melting enthalpy ($\Delta HM$) of the heterophasic propylene ethylene copolymer is between 10 and 30 J/g at a temperature of 0 to 130° C.

17 Claims, 2 Drawing Sheets

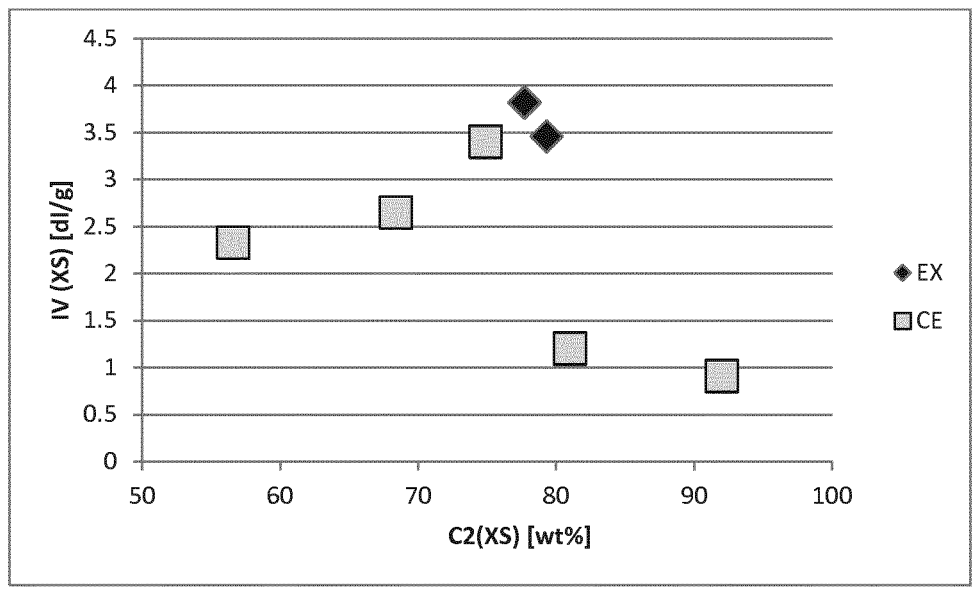
Figure 1. C2 (XS) vs IV of the rubber of inventive and comparative examples.
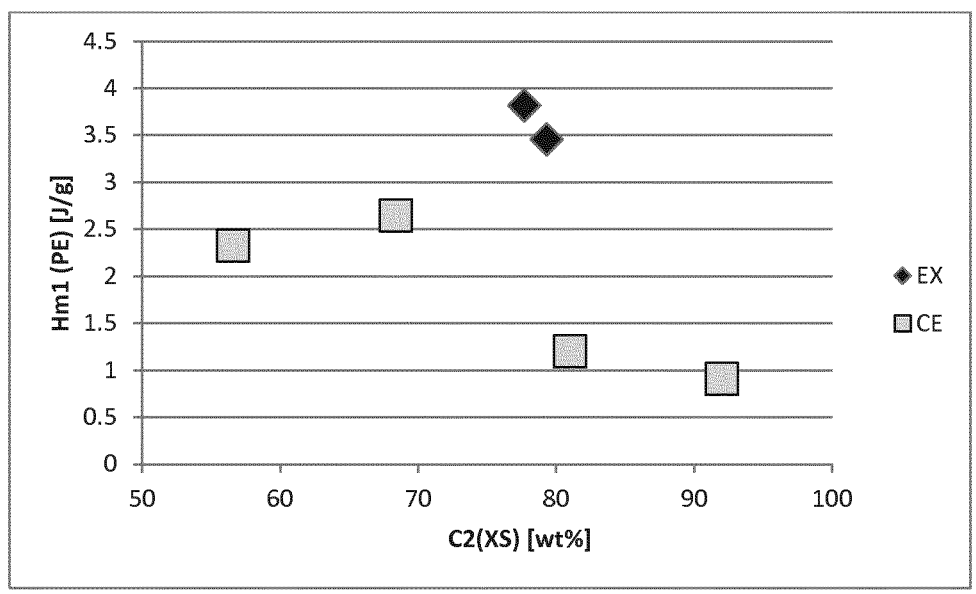
Figure 2. C2 (XS) vs ΔHf(PE) of inventive and comparative examples.

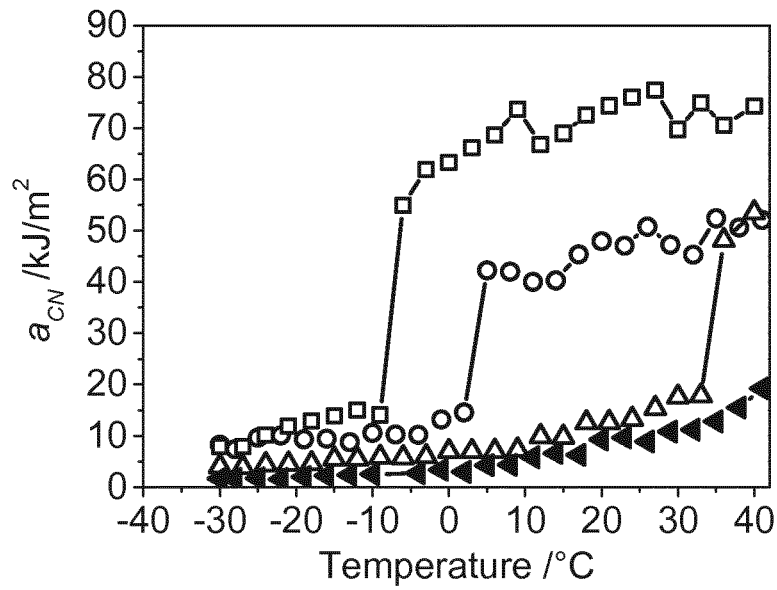
Figure 3: Instrumented Charpy curves for heterophasic materials : -□-Ex. 1 -o- C.E. 1 -Δ- C.E. 2 - ◄- C.E. 3
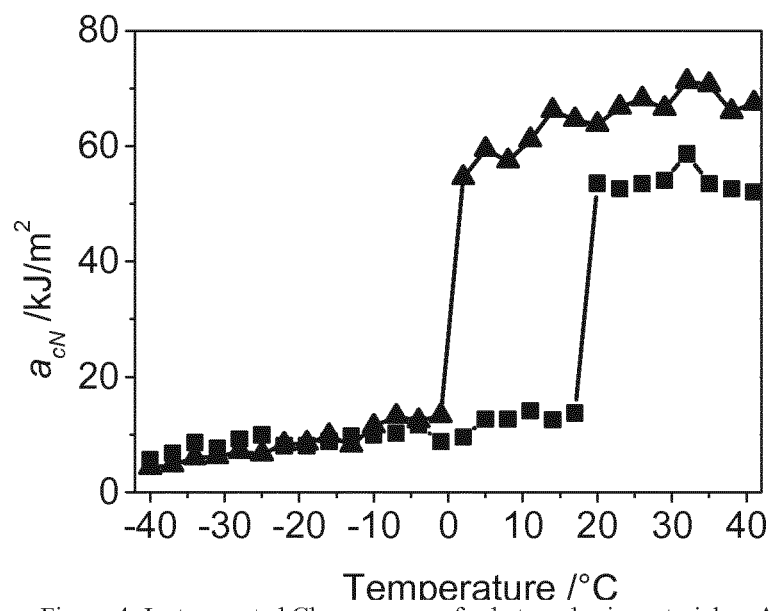
Figure 4: Instrumented Charpy curves for heterophasic materials: -▲- Ex. 2, -■- C.E. 4 1

HETEROPHASIC POLYPROPYLENE POLYMER

This invention relates to a heterophasic polypropylene copolymer produced using a single site catalyst with a particular ratio of xylene soluble to xylene insoluble fraction. Moreover, the xylene soluble fraction itself must possess a very high comonomer content yet exhibit moderate crystallinity. This combination of features leads to heterophasic polymers with moderate crystallinity and high molecular weight of the rubber phase, giving the materials an excellent mechanical profile. The invention also relates to a process for the polymerisation of propylene and ethylene using a bridged bis indenyl II-catalyst to form said polymer, in particular, polymerisations using certain metallocene catalysts in solid form but free of an external carrier in a multistep polymerisation process.

BACKGROUND

The glass transition temperature of crystalline isotactic polypropylene (iPP) of around 0° C. limits the applicability of all iPP-based materials in the sub-zero temperature range. Combining iPP as a matrix phase with an elastomeric component having a sufficiently low glass transition temperature (Tg) is a standard approach for overcoming this problem. Even then, however, the performance at temperatures below around −10° C. is often limited.

Conventional heterophasic polypropylene polymers are based on a matrix phase and a partly amorphous C3/C2 phase. Heterophasic polymers can be formed using heterogeneous Ziegler Natta catalysis and such polymers typically comprise a crystalline PE phase as well as the matrix phase and partially amorphous phase. In contrast, single site catalyst produced heterophasic copolymers have a matrix phase and largely amorphous EPR phase. These polymers however, suffer from a number of design problems.

One problem is the dispersion of the elastomeric component in the matrix, due in part to the particle size of the elastomeric phase. Problems can also arise due to the viscosity ratio between elastomeric component and matrix (PP) phase, and the compatibility between these two phases. Incompatibility is a result of the compositional differences between the materials. Good compatibility is often achieved at high propylene (C3) content (and hence low ethylene (C2) content) in the rubber phase which, however, leads to a higher Tg, again limiting the performance at very low temperatures, such as below −10° C.

Attempts to increase the elastomer content (i.e. the EPR phase) to thereby improve impact strength will necessarily reduce the stiffness or tensile modulus of the polymer. Also, increasing the ethylene content inevitably reduces the heat resistance of the polymer.

The C3/C2-ratio in the disperse elastomer phase therefore defines both the glass transition point Tg of the ethylene propylene rubber (EPR) phase and the compatibility with the matrix component, the latter co-defining the particle size.

The inventors have also found that a certain molecular weight limit (frequently expressed as intrinsic viscosity (IV(EPR)) has to be overcome for the elastomer phase to effectively increase the impact strength, whilst too high molecular weight will both reduce the overall flowability of the composition and again increase the particle size.

The present inventors sought the production of relatively high flow heterophasic copolymers having $MFR_2$ values of at least 0.5 g/10 min. At these high flow values, there are issues with property balance, e.g. in terms of impact strength and toughness. This invention offers heterophasic copolymers with an excellent balance of properties in terms of toughness and impact strength at high flow. These properties are achieved at commercially relevant glass transition temperatures Tg.

In particular, the present inventors have found that certain heterophasic propylene polymers having a rubber phase which is both at least partially crystalline whilst also possessing a very high ethylene content can have high weight average molecular weight (Mw) and hence offer attractive mechanical properties.

Similar polymers to those of claim 1 are known in the art. In EP-A-1,511,803, heterophasic copolymers are disclosed with high flow but with low ethylene content in both the polymer and the EPR phase thereof.

EP-A-2,053,086 generally describes Ziegler Natta based heterophasic copolymers with a 60-90 wt % of the matrix component and 10-40 wt % EPR component. C2 contents within the EPR phase are generally low.

WO2013/007650 and WO2013/007664 also describe heterophasic polypropylene resins comprising a propylene homopolymer matrix and an ethylene-propylene copolymer phase dispersed within the matrix with excellent low temperature impact properties. The polymers disclosed are however of low flow and the viscosity of the EPR phase is always lower than the matrix.

WO2009/077032 describes heterophasic copolymers with a relatively low viscosity xylene insoluble fraction containing high amounts of propylene monomer units within the rubber phase.

WO2012/028252 describes heterophasic polypropylene polymers with an amorphous xylene soluble matrix component having no more than 70 wt % ethylene in that matrix. These polymers have low viscosity.

WO2009/077034 describes heterophasic propylene polymers which can have high ethylene content within the rubber phase. However, this document generally describes polymers with a low xylene soluble content and low melting enthalpy of the polyethylene component (Hm(PE)). The catalyst used in this document does not produce crystalline fractions at the high ethylene content in the xylene soluble fraction in WO2009/077034. That is also reflected in its low Tg.

The present inventors sought polymers with high flow and good impact properties. In order to prepare the copolymers of the invention, the use of single site catalysis is required. The inventors have found that the process and catalysts described herein are ideal for the production of heterophasic propylene/ethylene copolymers as defined herein. This can be achieved with high productivity and high catalyst activity. Moreover, we have produced polymers that are stiffer at comparable impact strength.

As we note below, the catalysts used in the polymer manufacture are not themselves new and other similar catalysts are known. WO2009/054832 discloses conventionally supported metallocene catalysts which are branched at the 2-position of the cyclopentadienyl ring in at least one of the ligands making up the catalyst.

WO2007/116034 describes metallocene compounds substituted in the 2-position by a linear alkyl group. In particular the compound dimethylsilyl(2-methyl-4-phenyl-5-methoxy-6-tertbutylinden-1-yl dichlorozirconium is described which carries a methyl group at the 2-position.

WO2006/097497 describes certain symmetrical metallocenes based on tricyclic ring systems (tetrahydroindacenyl).

WO2011/135004 and WO2011/135005 describe rac-Me₂Si(2-Me-4-Ph-5-OMe-6-tBuInd)₂ZrCl₂ but only in the context of propylene homopolymerization.

The complexes used in the process of the invention are however described in the WO2013/007650 and suggested for propylene ethylene copolymerisation. However, their use explicitly in the production of the propylene ethylene copolymers as herein described is not known.

It has now surprisingly been found that the particular complexes described below in solid form but free from external carrier can be used in propylene ethylene polymerisation with excellent results. They enable the formation of the heterophasic propylene ethylene copolymers described herein.

Moreover, the present inventors sought a polymer made in a three step process based on a first slurry step followed by two gas phase steps. The problem with such a set-up is catalyst activity in the third reactor in the sequence as catalyst must have a long enough lifetime to have acceptable activity in the third reactor (GPR2), in which the rubber phase is produced. Additionally, the inventors sought high molecular weight capability in GPR2 to give better mechanical properties at both room temperature and low temperature.

We have surprisingly found that by increasing the ethylene content of the rubber phase to between 70 to 90 wt %, both higher molecular weight and moderately crystalline rubber is achievable using the catalysts described herein. This component of the heterophasic copolymer can be prepared in the GPR2 reactor. The resulting polymers have a good mechanical profile, in particular a higher stiffness.

SUMMARY OF INVENTION

Thus, viewed from one aspect the invention provides a heterophasic propylene ethylene copolymer having an MFR₂ of 0.5 to 100 g/10 min and obtained using single site catalysis comprising:

(i) a propylene homopolymer or propylene ethylene copolymer matrix having up to 4 wt % ethylene; and (ii) an ethylene propylene rubber (EPR) dispersed in the matrix;

said heterophasic propylene ethylene copolymer having a xylene cold soluble content (XS) of 20 to 40%;

wherein the ethylene content of the xylene cold soluble fraction of said heterophasic propylene ethylene copolymer is between 70 and 90 wt. %;

wherein the xylene cold soluble fraction of said heterophasic propylene ethylene copolymer has an intrinsic viscosity (IV) of 3.0 dl/g or more; and wherein the melting enthalpy (ΔHm) of the heterophasic propylene ethylene copolymer is between 10 and 30 J/g at a temperature of 0 to 130° C.

Viewed from another aspect the invention provides a process for the preparation of a heterophasic propylene ethylene copolymer as hereinbefore defined comprising polymerising:

(I) propylene and optionally ethylene in a slurry phase in the presence of a single site catalyst so as to form a propylene homopolymer or propylene ethylene copolymer matrix having up to 4 wt % ethylene as said matrix component; and subsequently polymerising (II) propylene and optionally ethylene in the gas phase in the presence of the catalyst and product from step (I) so as to form a propylene homopolymer or propylene ethylene copolymer; and subsequently polymerising (III) propylene and ethylene in the gas phase in the presence of the catalyst and product from step (II), so as to form an ethylene propylene rubber dispersed in the matrix.

Viewed from another aspect the invention provides a process for the preparation of a heterophasic propylene ethylene copolymer as hereinbefore defined comprising polymerising:

(I) propylene and optionally ethylene so as to form a propylene homopolymer or propylene ethylene copolymer matrix having up to 4 wt % ethylene as said matrix component; and subsequently polymerising (II) propylene and ethylene, preferably in the gas phase, so as to form an ethylene propylene rubber dispersed in the matrix;

wherein both steps (I) and (II) take place in the presence of the same single site solid particulate catalyst free from an external carrier, preferably a catalyst comprising (i) a complex of formula (I):

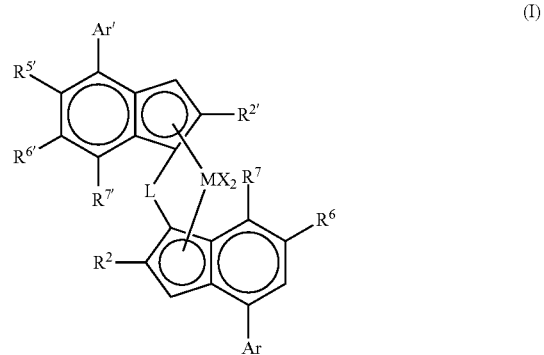

wherein

M is zirconium or hafnium;

each X is a sigma ligand;

L is a divalent bridge selected from —R'₂C—, —R'₂C—CR'₂—, —R'₂Si—, —R'₂Si—SiR'₂—, —R'₂Ge—, wherein each R' is independently a hydrogen atom, C₁-C₂₀-hydrocarbyl, tri(C₁-C₂₀-alkyl)silyl, C₆-C₂₀-aryl, C₇-C₇₀-arylalkyl or C₇-C₂₀-alkylaryl;

R² and R²' are each independently a C₁-C₂₀ hydrocarbyl radical optionally containing one or more heteroatoms from groups 14-16;

R⁵' is a C₁-₂₀ hydrocarbyl group containing one or more heteroatoms from groups 14-16 optionally substituted by one or more halo atoms;

R⁶ and R⁶' are each independently hydrogen or a C₁-₂₀ hydrocarbyl group optionally containing one or more heteroatoms from groups 14-16;

R⁷ and R⁷' are each independently hydrogen or C₁-₂₀ hydrocarbyl group optionally containing one or more heteroatoms from groups 14-16;

Ar is independently an aryl or heteroaryl group having up to 20 carbon atoms optionally substituted by one or more groups R¹;

Ar' is independently an aryl or heteroaryl group having up to 20 carbon atoms optionally substituted by one or more groups R¹;

each R¹ is a C₁-₂₀ hydrocarbyl group or two R¹ groups on adjacent carbon atoms taken together can form a fused 5 or 6 membered non aromatic ring with the Ar group, said ring being itself optionally substituted with one or more groups R⁴;

each $R^4$ is a $C_{1-20}$ hydrocarbyl group;

and (ii) a cocatalyst comprising a compound of a group 13 metal, e.g. Al or boron compound.

The catalyst used in the process of the invention is in solid particulate form free from an external carrier. Ideally, the catalyst is obtainable by a process in which (a) a liquid/liquid emulsion system is formed, said liquid/liquid emulsion system comprising a solution of the catalyst components (i) and (ii) dispersed in a solvent so as to form dispersed droplets; and (b) solid particles are formed by solidifying said dispersed droplets.

Viewed from another aspect therefore, the invention provides a process for the preparation of an propylene ethylene copolymer as hereinbefore defined in which the catalyst as hereinbefore defined is prepared by obtaining (i) a complex of formula (I) and a cocatalyst (ii) as hereinbefore described; forming a liquid/liquid emulsion system, which comprises a solution of catalyst components (i) and (ii) dispersed in a solvent, and solidifying said dispersed droplets to form solid particles.

Viewed from another aspect the invention provides an article such as a film comprising the heterophasic propylene ethylene copolymer as hereinbefore defined.

Viewed from another aspect the invention provides the use of a heterophasic propylene ethylene copolymer as hereinbefore defined in the manufacture of an article.

Definitions

Throughout the description the following definitions are employed.

References to xylene solubility or insolubility are always based on xylene cold solubility at 23° C. The test for this parameter is given at the end of the description.

By free from an external carrier is meant that the catalyst does not contain an external support, such as an inorganic support, for example, silica or alumina, or an organic polymeric support material.

The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl.

Unless otherwise stated, preferred $C_{1-20}$ hydrocarbyl groups are $C_{1-70}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups, especially $C_{1-10}$ alkyl groups, $C_{6-10}$ aryl groups, or $C_{7-12}$ arylalkyl groups, e.g. $C_{1-8}$ alkyl groups. Most especially preferred hydrocarbyl groups are methyl, ethyl, propyl, isopropyl, tertbutyl, isobutyl, $C_{5-6}$-cycloalkyl, cyclohexylmethyl, phenyl or benzyl.

The term halo includes fluoro, chloro, bromo and iodo groups, especially chloro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M is coordinated by ligands X so as to satisfy the valency of the metal ion and to fill its available coordination sites. The nature of these σ-ligands can vary greatly.

Catalyst activity is defined in this application to be the amount of polymer produced/g catalyst/h. The term productivity is also sometimes used to indicate the catalyst activity although herein it designates the amount of polymer produced per unit weight of catalyst.

The term XI or XCU is used herein to refer to the xylene insoluble component. The term XS or XCS is used to refer to the xylene soluble component.

DETAILED DESCRIPTION OF INVENTION

This invention relates to a heterophasic propylene ethylene copolymer made using single site catalysis. Through the use of single site catalysis, the nature of the EPR component can be tailored to achieve surprisingly high Mw and moderate crystallinity. This provides an excellent mechanical profile such as good impact strength at both ambient and low temperatures at high melt flow rates. Good properties are achieved at relevant stiffness values.

It is preferred if the weight ratio of xylene soluble (XCS) and xylene insoluble (XI or XCU) components in the polymer of the invention is 20:80 to 40:60, preferably 20:80 to 35:65, even more preferably 25:75 to 35:65.

The ethylene content of the XCS fraction is preferably in the range of 71 to 90 wt %, more preferably 75 to 85 wt %.

The polymers of the invention comprise a matrix component and a partially amorphous ethylene propylene rubber component having the properties above.

Matrix Phase/Component

The matrix component (also known as the matrix phase) is a propylene homopolymer or propylene ethylene copolymer. The ethylene content in this component is low, 4 wt % or less, preferably 3 wt % or less, more preferably 2 wt % or less, ideally 1.5 wt % or less. Even more preferably there is less than 1 wt % ethylene in the matrix component, such as 0.5 wt % or less. It is therefore preferred if the ethylene content of the xylene insoluble fraction of the matrix component is 4 wt % or less, preferably 3 wt % or less, such as 2 wt % or less, ideally 1.5 wt % or less. Even more preferably there is less than 1 wt % ethylene in the xylene insoluble fraction (C2(XI)<1 wt %), such as less than 0.5 wt % (C2(XI)<0.5 wt %).

The $MFR_2$ of this matrix component may be in the range of 10 to 250 g/10 min, such 20 to 200 g/10 min, preferably 25 to 100 g/10 min.

It is preferred if the matrix component is a homopolymer, i.e. it contains propylene repeating units only.

There can be up to 80 wt % of this component in the polymer of the invention. Ideally there is 60 to 80 wt % of the matrix component, such as 65 to 80 wt % or 65 to 75 wt % in the heterophasic copolymer as a whole. The glass transition temperature of the polypropylene matrix component is preferably in the range of 10 to −10° C., e.g. 5 to −5° C.

It is preferred if the matrix phase is at least partially crystalline thus ensuring that the polymer as a whole comprises two crystalline phases and hence two melting points.

The matrix component is ideally an isotactic propylene matrix component. The matrix component may consist of a single propylene homopolymer but may also comprise a mixture of different propylene homopolymers. Ideally, however a single propylene homopolymer is present.

EPR Phase/Xylene soluble component

Component (II) is an ethylene propylene rubber (EPR). This component has an excess of ethylene. There should be no other comonomers present in the EPR phase. This component forms at least 20 wt % of the heterophasic copolymer as a whole, such as at least 25 wt %. It should form no more than 40 wt % of the polymer such as no more than 35 wt % of the heterophasic polymer.

It is thus preferred if the EPR fraction of the polymer as a whole is 20 to 40 wt %, such as 20 to 35 wt %, or even more preferably 25 to 35 wt %.

The ethylene content of the xylene soluble fraction, (C2(XS)) is between 70 and 90 wt %, preferably 71 to 90 wt %, most preferably 75 to 85 wt %.

It has been found that the properties of the polymer of the invention, especially the impact strength are improved at higher ethylene contents. This is achieved however, without damaging other critical properties of the polymer.

Alternatively viewed, the ethylene content of the EPR phase may be 70 to 90 wt %, such as 71 to 85 wt %.

The EPR phase is generally a random copolymer. It is preferably dispersed within the matrix phase and that is best achieved by producing the EPR phase after the matrix phase in a multistage polymerisation reaction as defined further below.

The glass transition temperature of the EPR/xylene soluble phase may be in the range of −20 to −60° C., such as −25 to −55° C., most preferably −30 to −45° C.

The $MFR_2$ of the xylene soluble component or xylene soluble phase is preferably more than 0.01 g/10 min, preferably more than 0.05 g/10 min, more preferably more than 0.1 g/10 min. The upper limit or the $MFR_2$ of the xylene soluble component is preferably 2 g/10 min.

If the MFR values of a component cannot be measured directly, they can be calculated from intrinsic viscosity measurements based on the correlations defined in C. Grein, M. Gahleitner, B. Knogler & S. Nestelberger, *Melt viscosity effects in Ethylene-Propylene Copolymers*, Rheol. Acta, 46 (2007) 1083-1089. From the MFR of the total polymer and the MFR of the XS fraction (sometimes called the XCS fraction), the MFR of the matrix component of an impact copolymer can be calculated using a logarithmic mixing rule, i.e. using the following equation $$MFR(Total) = 10^{(1-w(EPR))\log 10(MFR(Matrix)) + w(EPR)\log 10(MFR(XCS))}$$

with w(EPR) being the weight fraction of the elastomeric phase, approximated by the weight fraction of the XS component.

Polymer Properties

The polymer of the invention is a heterophasic ethylene/propylene copolymer. By heterophasic is meant that the polymer contains both a crystalline portion and an amorphous portion. It must be made using a single site catalyst material, e.g. one as herein defined.

The polymer as a whole has a xylene soluble (XS) fraction of 20 to 40 wt %, such as 20 to 35 wt %, or 25 to 35 wt %.

It is also a preferred feature of claim 1 that the intrinsic viscosity (IV) of the XS portion of the polymer as a whole is greater than the intrinsic viscosity (IV) of the xylene insoluble portion as a whole (IV(XI)). The difference may be 0.1 dl/g or more, e.g. 0.2 dl/g or more such as 0.5 dl/g or more.

Intrinsic viscosity is a measure of molecular weight and thus the XS portion of the polymer as a whole can be considered to have a higher Mw (weight average molecular weight) than that of the xylene insoluble portion.

Alternatively viewed, the intrinsic viscosity (IV) of the XS portion of the polymer as a whole is greater than the intrinsic viscosity (IV) of the matrix component.

Alternatively viewed, the IV of the EPR phase is preferably greater than the IV of the matrix phase.

The value of the IV of the XS phase divided by the IV of the xylene insoluble phase (XI) is preferably more than 1 to 5, such as IV(XS)/IV(XI) 1.2 to 4, preferably 1.2 to 3.0.

Alternatively viewed, the IV of the XS portion of the polymer as a whole/the IV of the matrix phase is 1 to 5, such as 1.2 to 4 dl/g, especially IV(XS)/IV(M) of 1.2 to 3.0.

Alternatively viewed, the IV of the EPR portion of the polymer/the IV of the matrix phase is 1 to 5, such as IV(EPR)/IV(M) 1.2 to 4, preferably 1.2 to 3.0.

The actual IV of the EPR phase or the actual IV of the XS fraction may be in the range of 3 to 5 dl/g, such as 3 to 4 dl/g.

Preferably, where the intrinsic viscosity of the xylene soluble fraction of said heterophasic propylene ethylene copolymer is greater than the intrinsic viscosity of the xylene insoluble fraction of said copolymer that the difference is at least 0.2 dl/g, such as at least 0.5 dl/g.

Preferably, where the intrinsic viscosity of the xylene soluble fraction of said heterophasic propylene ethylene copolymer is greater than the intrinsic viscosity of the matrix component of said copolymer that the difference is at least 0.2 dl/g, such as at least 0.5 dl/g.

Preferably, where the intrinsic viscosity of the EPR fraction of said heterophasic propylene ethylene copolymer is greater than the intrinsic viscosity of the matrix fraction of said copolymer that the difference is at least 0.2 dl/g, such as at least 0.5 dl/g.

The IV of the matrix phase or the IV of the xylene insoluble fraction is typically in the range of 0.5 to 3, such as 1 to 2 dl/g and is preferably lower than that of the EPR phase or XS portion.

The IV of the polymer as a whole may be 0.9 to 3 dl/g, preferably in the range of 1.0 to 2.5 dl/g.

It is preferred if the overall $MFR_2$ of the copolymer of the invention is in the range from 0.5 to 100 g/10 min, preferably 0.7 to 60 g/10 min, more preferably 1 to 40 g/10 min, especially 2 to 20 g/10 min, most especially 2 to 15 g/10 min.

The ethylene content of the polymer as a whole may be in the range of 10 to 45 wt %, such as 15 to 40 wt %.

The incorporation of the comonomer reduces both the melting point and the crystallinity of the polypropylene polymer, and hence the melting enthalpy as determined in DSC (ISO 3146).

It is in particular preferred however, that the EPR phase as defined above is partially crystalline rather than amorphous. A polymer is amorphous when it has no definite order or crystalline structure, expressed as a lack of melting point and no melting enthalpy when investigated by DSC. The term "partially crystalline" implies here that the heterophasic copolymer of the invention has crystallinity at a level corresponding to a melting enthalpy of 10 to 30 J/g when measured at temperatures of up to 130° C., i.e. the melting enthalpy of the polyethylene peak within the polymer. A preferred range is 13 to 25 J/g. These values therefore indicate a remarkable degree of crystallinity in a xylene soluble phase with such a high ethylene content.

Preferably the fraction of the polypropylene matrix present has a melting enthalpy of 40 to 90 J/g at a melting temperature of 130 to 170° C.

Thus, the heterophasic polymer of the invention will exhibit two melting points corresponding to the matrix phase and EPR phase of the polymer. DSC is thus measured on the polymer as a whole and exhibits two peaks (the PP and the crystalline EPR (or PE) peak). The melting enthalpy Hm of this "PE peak" is important and must lie between 10 and 30 J/g. This indicates that the EPR fraction is partially crystalline. Too low crystallinity leads to worse mechanical performance especially in terms of impact strength and BDTT performance. Too high crystallinity leads to a reduction in xylene solubility and a drop in impact strength. The use therefore of moderate crystallinity along with a high ethylene content in the XS fraction maximises mechanical performance.

The tensile modulus of the heterophasic polymers of the invention may be at least 800 MPa, such as at least 900 MPa, preferably at least 950 MPa. The tensile modulus values we observe are very high given the nature of the polymers claimed herein.

It is a feature of the invention that impact properties of the heterophasic polymer are excellent. The impact properties, as measured by Charpy notched instrumented impact strength (ISO 179 1 eA) at 23° C. are preferably 40 kJ/m$^2$ or more, such as 50 kJ/m$^2$ or more, especially 60 kJ/m$^2$ of more. At −20° C. the values are 6.0 kJ/m$^2$ or more, such as 7.0 kJ/m$^2$ or more.

The polymers of the invention have excellent brittle to ductile transition temperatures (BDTT). The BDTT transition preferably occurs at a temperature of 10° C. or less, such as 5° C. or less, more preferably 0° C. or less, determined from Charpy instrumented impact strength according to ISO 179-2:2000.

The polymers of the invention may possess two melting points. The first melting point should be less than 130° C. and the second higher than 130° C. The lower melting point is preferably in the range of 40 to 80° C., such as 50 to 75° C. The higher melting point is ideally in the range of 135 to 160° C., such as 140 to 160° C., especially 140 to 155° C.

Catalyst

The heterophasic polymers as described herein are preferably made using certain metallocene catalysts. The complexes and hence catalysts of the invention preferably used are based on a complex of formula (I):

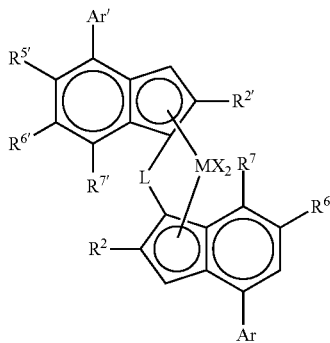

(I)

wherein
M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, C$_1$-C$_{20}$-hydrocarbyl, tri(C$_1$-C$_{20}$-alkyl)silyl, C$_6$-C$_{20}$-aryl, C$_7$-C$_{20}$-arylalkyl or C$_7$-C$_{20}$-alkylaryl;
R$^2$ and R$^{2'}$ are each independently a C$_1$-C$_{20}$ hydrocarbyl radical optionally containing one or more heteroatoms from groups 14-16;
R$^{5'}$ is a C$_{1-20}$ hydrocarbyl group containing one or more heteroatoms from groups 14-16 optionally substituted by one or more halo atoms;
R$^6$ and R$^{6'}$ are each independently hydrogen or a C$_{1-20}$ hydrocarbyl group optionally containing one or more heteroatoms from groups 14-16;

R$^7$ and R$^{7'}$ are each independently hydrogen or C$_{1-20}$ hydrocarbyl group optionally containing one or more heteroatoms from groups 14-16;
Ar is independently an aryl or heteroaryl group having up to 20 carbon atoms optionally substituted by one or more groups R$^1$;
Ar' is independently an aryl or heteroaryl group having up to 20 carbon atoms optionally substituted by one or more groups R$^1$;
each R$^1$ is a C$_{1-20}$ hydrocarbyl group or two R$^1$ groups on adjacent carbon atoms taken together can form a fused 5 or 6 membered non aromatic ring with the Ar group, said ring being itself optionally substituted with one or more groups R$^4$;
each R$^4$ is a C$_{1-20}$ hydrocarbyl group.

Such catalysts are described in WO2013/007650 which is incorporated herein by reference. Thus, preferred complexes of use in the invention are of formula (II') or (II)

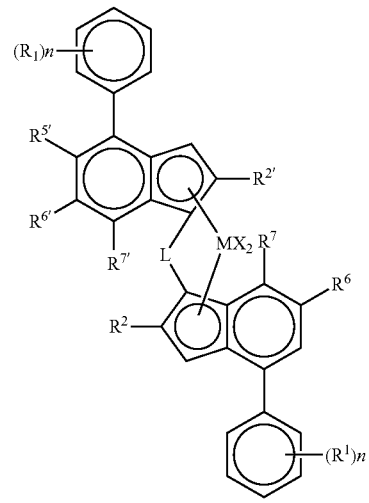

(II')

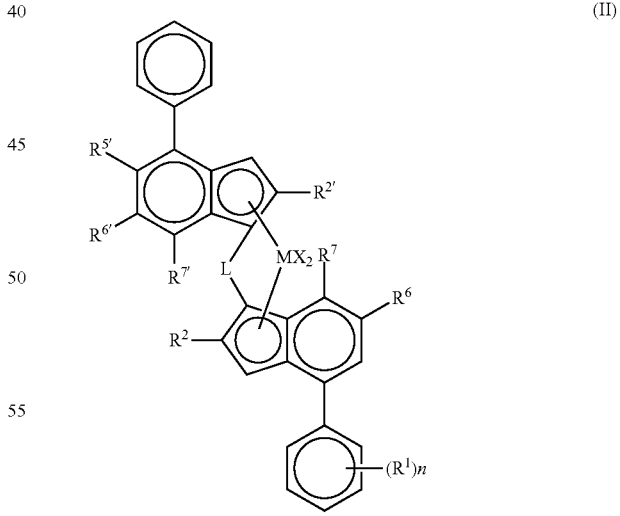

(II)

wherein
M is zirconium or hafnium;
each X is a sigma ligand, preferably each X is independently a hydrogen atom, a halogen atom, C$_{1-6}$ alkoxy group, C$_{1-6}$ alkyl, phenyl or benzyl group;
L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$ alkyl, $C_{3-10}$ cycloalkyl, tri($C_{1-20}$-alkyl)silyl, $C_{6-20}$-aryl, $C_{7-20}$ arylalkyl or $C_{7-20}$ alkylaryl;

each $R^2$ or $R^{2'}$ is a $C_{1-10}$ alkyl group;

$R^{5'}$ is a $C_{1-10}$ alkyl group or $Z'R^{3'}$ group;

$R^6$ is hydrogen or a $C_{1-10}$ alkyl group;

$R^{6'}$ is a $C_{1-10}$ alkyl group or $C_{6-10}$ aryl group;

$R^7$ is hydrogen, a $C_{1-6}$ alkyl group or $ZR^3$ group;

$R^{7'}$ is hydrogen or a $C_{1-10}$ alkyl group;

Z and Z' are independently O or S;

$R^{3'}$ is a $C_{1-10}$ alkyl group, or a $C_{6-10}$ aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$ hydrocarbyl group, e.g. $C_{1-10}$ alkyl group.

Further preferred complexes of use in the invention are of formula (III') or (III):

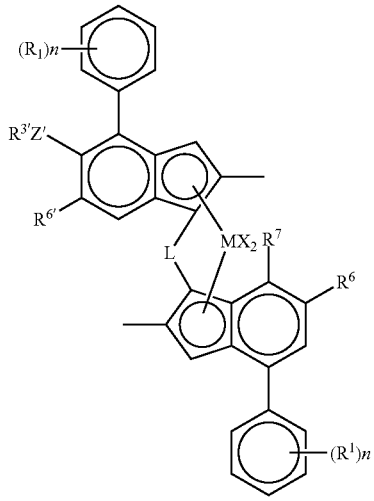

(III')

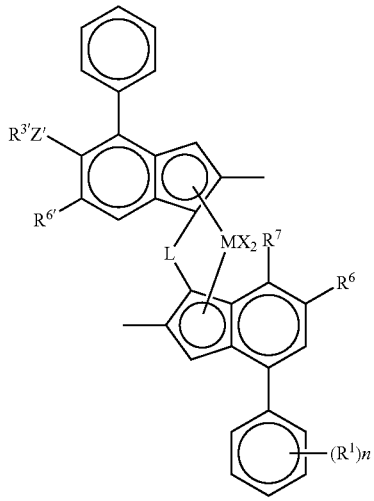

(III)

M is zirconium or hafnium;

each X is a sigma ligand, preferably each X is independently a hydrogen atom, a halogen atom, $C_{1-6}$ alkoxy group, $C_{1-6}$ alkyl, phenyl or benzyl group;

L is a divalent bridge selected from —R'$_2$C— or —R'$_2$Si— wherein each R' is independently a hydrogen atom, $C_{1-20}$ alkyl or $C_{1-10}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0 to 4, e.g. 0, 1 or 2; and each $R^1$ is independently a $C_{1-10}$ alkyl group.

Further preferred complexes of use in the invention are of formula (IV') or (IV):

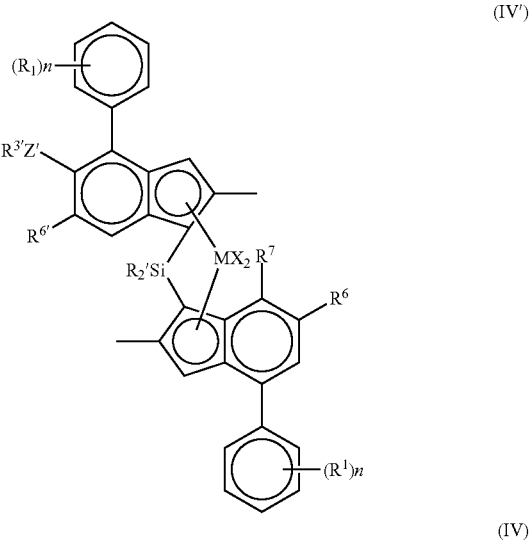

(IV')

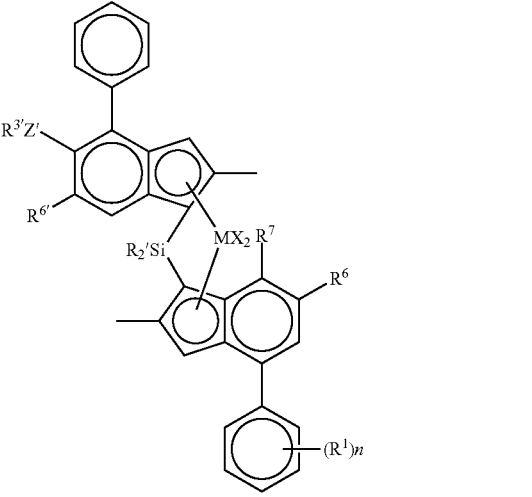

(IV)

M is zirconium or hafnium;

each X is a sigma ligand, preferably each X is independently a hydrogen atom, a halogen atom, $C_{1-6}$-alkoxy group, $C_{1-6}$-alkyl, phenyl or benzyl group;

each R' is independently a hydrogen atom, $C_{1-20}$ alkyl or $C_{3-7}$ cycloalkyl;

$R^6$ is hydrogen or a $C_{1-10}$ alkyl group;

$R^{6'}$ is a $C_{1-10}$ alkyl group or $C_{6-10}$ aryl group;

$R^7$ is hydrogen, $C_{1-6}$ alkyl or $OC_{1-6}$ alkyl;

Z' is O or S;

$R^{3'}$ is a $C_{1-10}$ alkyl group, or $C_{6-10}$ aryl group optionally substituted by one or more halo groups;

n is independently 0, 1 to 2; and each $R^1$ is independently a $C_{3-8}$ alkyl group.

Most especially, the complex of use in the invention is of formula (V') or (V):

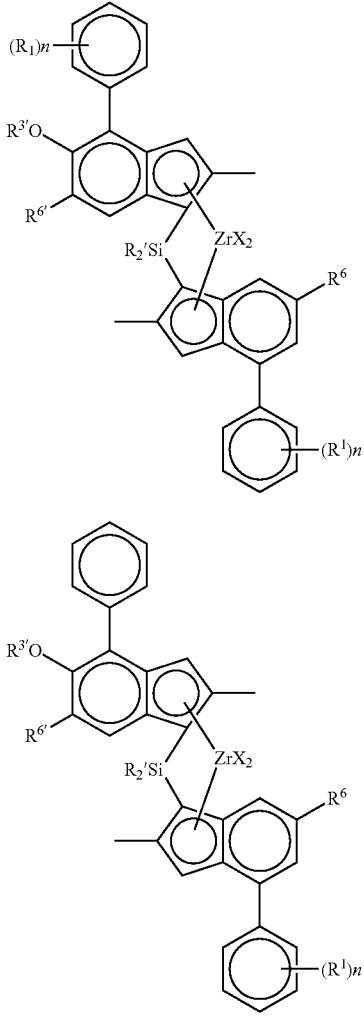

wherein each X is a sigma ligand, preferably each X is independently a hydrogen atom, a halogen atom, $C_{1-6}$-alkoxy group, $C_{1-6}$-alkyl, phenyl or benzyl group;
R' is independently a $C_{1-6}$ alkyl or $C_{3-10}$ cycloalkyl;
$R^1$ is independently $C_{3-8}$ alkyl;
$R^6$ is hydrogen or a $C_{3-8}$ alkyl group;
$R^{6'}$ is a $C_{3-8}$ alkyl group or $C_{6-10}$ aryl group;
$R^{3'}$ is a $C_{1-6}$ alkyl group, or $C_{6-10}$ aryl group optionally substituted by one or more halo groups; and
n is independently 0, 1 or 2.

Particular compounds of the invention include:
rac-anti-Me2Si(2-Me-4-Ph-6-tBu-Ind)(2-Me-4-Ph-5-OMe-6-tBu-Ind)ZrCl2;
rac-anti-Me2Si(2-Me-4-(p-tBuPh)-Ind)(2-Me-4-Ph-5-OMe-6-tBu-Ind)ZrCl2
rac-anti-Me2Si(2-Me-4-(3,5-di-tBuPh)-6-tBu-Ind)(2-Me-4-Ph-5-OMe-6-tBu-Ind)ZrCl2;
rac-anti-Me2Si(2-Me-4-Ph-6-tBu-Ind)(2-Me-4,6-di-Ph-5-OMe-Ind)ZrCl2;
rac-anti-Me$_2$Si(2-Me-4-(p-tBuPh)-Ind)(2-Me-4-Ph-5-OC$_6$F$_5$)-6-iPr-Ind)ZrCl2;
rac-anti-Me(CyHex)Si(2-Me-4-Ph-6-tBu-Ind)(2-Me-4-Ph-5-OMe-6-tBu-Ind)ZrCl$_2$;
rac-anti-Me$_2$Si(2-Me-4-(3,5-di-tBuPh)-7-Me-Ind)(2-Me-4-Ph-5-OMe-6-tBu-Ind)ZrCl$_2$;
rac-anti-Me$_2$Si(2-Me-4-(3,5-di-tBuPh)-7-OMe-Ind)(2-Me-4-Ph-5-OMe-6-tBu-Ind)ZrCl$_2$;
rac-anti-Me$_2$Si(2-Me-4-(p-tBuPh)-6-tBu-Ind)(2-Me-4-Ph-5-OMe-6-tBu-Ind)ZrCl$_2$;
rac-anti-Me$_2$Si(2-Me-4-(p-tBuPh)-Ind)(2-Me-4-(4-tBuPh)-5-OMe-6-tBu-Ind)ZrCl$_2$;
rac-anti-Me$_2$Si(2-Me-4-(p-tBuPh)-Ind)(2-Me-4-(3,5-tBu2Ph)-5-OMe-6-tBu-Ind)ZrCl$_2$;
rac-anti-Me$_2$Si(2-Me-4-(p-tBuPh)-Ind)(2-Me-4-Ph-5-OiBu-6-tBu-Ind)ZrCl$_2$;

The synthesis of these materials is discussed in WO2013/007650.

Cocatalyst

To form an active catalytic species it is normally necessary to employ a cocatalyst as is well known in the art. Cocatalysts comprising one or more compounds of Group 13 metals, like organoaluminium compounds or borates used to activate metallocene catalysts are suitable for use in this invention. Thus the cocatalyst is preferably an alumoxane, like MAO. Borate cocatalysts can also be employed. The use of $B(C_6F_5)_3$, $C_6H_5N(CH_3)_2H$:$B(C_6F_5)_4$, $(C_6H_5)_3C$:$B(C_6F_5)_4$ or $Ni(CN)_4[B(C_6F_5)_3]_4^{2-}$ is especially preferred. Suitable cocatalysts are described in WO2013/007650.

Suitable amounts of cocatalyst will be well known to the skilled man.

Manufacture

The catalyst used to manufacture the heterophasic copolymers of the invention is ideally provided in solid particulate form but unsupported, i.e. no external carrier is used. In order to provide the catalyst of the invention in solid form but without using an external carrier, it is preferred if a liquid liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape and particle size and without using any added external porous support material, such as an inorganic oxide, e.g. silica. Also desirable surface properties can be obtained. WO2013/007650 again contains comprehensive details of this process.

Catalyst Prepolymerisation

The use of the heterogeneous, non-supported catalysts, (i.e. "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is preferred to "prepolymerise" the catalyst before using it in polymerisation process. It has to be noted that prepolymerisation in this regard is part of the catalyst preparation process, being a step carried out after a solid catalyst is formed. This catalyst prepolymerisation step is not part of the actual polymerisation configuration, which might comprise a conventional process prepolymerisation step as well. After the catalyst prepolymerisation step, a solid catalyst is obtained and used in polymerisation.

Catalyst "prepolymerisation" takes place following the solidification step of the liquid-liquid emulsion process hereinbefore described. Prepolymerisation may take place by known methods described in the art, such as that described in WO 2010/052263, WO 2010/052260 or WO 2010/052264. Preferable embodiments of this aspect of the invention are described herein.

As monomers in the catalyst prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene. The catalyst prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per)fluorinated hydrocarbons is typically in the range of 0 to 140° C., preferably 30 to 120° C., like 50 to 110° C.

Where the catalyst prepolymerisation is done in fluorinated hydrocarbons, the temperature for the prepolymerisation step is below 70° C., e.g. in the range of −30 to 70° C., preferably 0-65° C. and more preferably in the range 20 to 55° C.

Pressure within the prepolymerisation vessel is preferably higher than atmospheric pressure to minimize the eventual leaching of air and/or moisture into the catalyst vessel. Preferably the pressure is in the range of at least 1 to 15 bar, preferably 2 to 10 bar. The prepolymerisation vessel is preferably kept in an inert atmosphere, such as under nitrogen or argon or similar atmosphere.

Prepolymeristaion is continued until the prepolymerisation degree defined as weight of polymer matrix/weight of solid catalyst before prepolymerisation step is reached. The degree is below 25, preferably 0.5 to 10.0, more preferably 1.0 to 8.0, most preferably 2.0 to 6.0.

Use of the catalyst prepolymerisation step offers the advantage of minimising leaching of catalyst components and thus local overheating.

After prepolymerisation, the catalyst can be isolated and stored.

Polymerisation

The polymers of the invention can be prepared by blending the necessary components that have been formed separately. However, the polymers are typically (and preferably) made in a multistep process well known in the art. A preferred multistage process is a "loop-gas phase"-process, such as developed by Borealis A/S, Denmark (known as BORSTAR® technology) described e.g. in patent literature, such as in EP-A-0887379 or in WO 92/12182.

The invention preferably relates to the copolymerisation of propylene and ethylene in at least two step a process so as to form a heterophasic propylene ethylene copolymer. Such a polymer may also be known as an impact copolymer.

Polymerization in the method of the invention may be effected in two or more, e.g. 2 or 3, polymerization reactors. The process may also involve a prepolymerisation reaction. This prepolymerisation step is a conventional step used routinely in polymer synthesis and is to be distinguished from the catalyst prepolymerisation step discussed above.

Ideally, the process of the invention employs three main reactors, a first reactor operating in bulk, a first gas phase reactor and a second gas phase reactor. The process may also utilise a prepolymerisation step.

The inventive process of the invention can form a heterophasic propylene ethylene copolymer. In that polymer, it is preferred if the first component, the matrix component is a homopolymer and is subsequently combined with a copolymeric amorphous fraction to form the heterophasic copolymer of the invention. The partially crystalline EPR fraction is preferably formed second and is preferably formed in the gas phase.

Ideally therefore a propylene homopolymer matrix is formed in a bulk step and a first gas phase step, and a propylene ethylene copolymer partially crystalline phase formed in the second gas phase step.

For bulk and gas phase copolymerisation reactions, the reaction temperature used will generally be in the range 60 to 115° C. (e.g. 70 to 110° C.), the reactor pressure will generally be in the range 10 to 40 bar for gas phase reactions with bulk polymerisation operating at slightly higher pressures. The residence time will generally be 0.25 to 8 hours (e.g. 0.3 to 3 hours). The gas used will be the monomer optionally as mixture with a non-reactive gas such as nitrogen or propane. It is a particular feature of the invention that polymerisation takes place at temperatures of at least 60° C.

Generally the quantity of catalyst used will depend upon the nature of the catalyst, the reactor types and conditions and the properties desired for the polymer product. As is well known in the art hydrogen can be used for controlling the molecular weight of the polymer.

Heterophasic copolymers can be prepared with the catalysts of the invention and the activity of this catalyst in both liquid and gas phase is much better than that obtained with a standard metallocenes. The higher activity in bulk and gas phase makes those of the invention the preferred catalyst.

In general therefore the catalysts of use in the manufacture of the polymers of the invention can provide:
high activity in bulk propylene polymerisation;
improved ethylene incorporation in propylene copolymers;
high activity obtained in C2/C3 copolymerization in gas phase;
good polymer morphology.

The heterophasic polypropylene resin of the invention can be used in the manufacture of an article such as a flexible pipe/tube, profile, cable insulation, sheet or film. These articles are useful in the medical and general packaging area but also for technical purposes like electrical power cables or geomembranes. Alternatively, the heterophasic polypropylene resin can be used in impact modification of a composition for injection moulding of articles, such as for technical applications in the automotive area.

For impact modification, between 5 and 50 wt % of the inventive heterophasic polypropylene resin will be added to another polypropylene resin having a significantly higher MFR than the inventive heterophasic polypropylene resin.

Thus, the invention also relates to polymer blends comprising the heterophasic polypropylene resins of the invention, in particular blends of it with other propylene polymers. The heterophasic polypropylene copolymer of the invention may form 5 to 50 wt % of such a blend, such as 10 to 40 wt %, in particular 15 to 30 wt % of such a blend.

The heterophasic polypropylene copolymer might be mixed with a polypropylene having a higher MFR$_2$, such as at least 10 g/10 min. In particular, it can be mixed with polypropylenes used in car parts. Such polypropylenes may be homopolymers. Preferably they will not be other elastomeric polymers like another EPR.

The polymers of the invention are useful in the manufacture of a variety of end articles such as films (cast, blown or BOPP films), moulded articles (e.g. injection moulded, blow moulded, rotomoulded articles), extrusion coatings and so on. Preferably, articles comprising the films of the invention are used in packaging.

Packaging of interest include heavy duty sacks, hygiene films, lamination films, and soft packaging films.

Due to their excellent low temperature properties, films of the invention are ideal for use in frozen packaging.

The invention will now be illustrated by reference to the following non-limiting examples and figures. FIG. 1 shows the relationship between IV and C2 content in the XS fraction in the polymer of the invention. FIG. 2 shows the relationship between C2(XS) wt % in the polymer and the crystallinity measured as ΔHm.

FIGS. 3 and 4 shows charpy impact data for polymers of the invention verses comparative polymers.

Measurement Methods:

DSC Method:

The melting point ($T_m$), melting enthalpy ($H_m$) and crystallization temperature ($T_c$) were determined on a DSC200 TA instrument according to ISO 3146, by placing a 5-7 mg polymer sample, into a closed DSC aluminum pan, heating the sample from −10° C. to 210° C. at 10° C./min, holding for 5 min at 210° C., cooling from 210° C. to −10° C., holding for 5 min at −10° C., heating from −10° C. to 210° C. at 10° C./min. The reported $T_m$ is the maximum of the curve from the second heating scan and $T_c$ is the maximum of the curve of the cooling scan. If more than one melting peak is present, a separate value for $T_m$ and $H_m$ for the PP and the PE part can be identified, $T_m$(PE) being in the range of 0 to 130° C. and $T_m$(PP) being in the range of 131 to 170° C.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at a loadings such as 2.16 kg (MFR2).

The MFR of the XS fraction can also be calculated from the intrinsic viscosity (IV) of said fraction using the correlations defined in C. Grein, M. Gahleitner, B. Knogler & S. Nestelberger, Melt viscosity effects in Ethylene-Propylene Copolymers, Rheol. Acta, 46 (2007) 1083-1089. From the MFR of the total polymer and the MFR of the XS fraction, the MFR of the matrix component of an impact copolymer can be calculated using a logarithmic mixing rule, i.e. assuming the validity of the following equation:

$$MFR(Total)=10^{(1-w(EPR))log\ 10(MFR(Matrix))+w(EPR)log\ 10(MFR(XCS))}$$

with w(EPR) being the weight fraction of the elastomeric phase, approximated by the weight fraction of the XS.

Intrinsic viscosity is measured according to DIN ISO 1628/1 and/3, October 1999 (in Decalin at 135° C.). The intrinsic viscosity (IV) value increases with the molecular weight of a polymer.

GPC: Molecular Weight Averages, Molecular Weight Distribution, and Polydispersity Index (Mn, Mw, Mw/Mn)

Molecular weight averages (Mw, Mn), Molecular weight distribution (MWD) and its broadness, described by polydispersity index, PDI=Mw/Mn (wherein Mn is the number average molecular weight and Mw is the weight average molecular weight) were determined by Gel Permeation Chromatography (GPC) according to ISO 16014-4:2003 and ASTM D 6474-99. A Waters GPCV2000 instrument, equipped with differential refractive index detector and online viscosimeter was used with 2×GMHXL-HT and 1× G7000HXL-HT TSK-gel columns from Tosoh Bioscience and 1,2,4-trichlorobenzene (TCB, stabilized with 250 mg/L 2,6-Di tert butyl-4-methyl-phenol) as solvent at 140° C. and at a constant flow rate of 1 mL/min. 209.5 μL of sample solution were injected per analysis. The column set was calibrated using universal calibration (according to ISO 16014-2:2003) with at least 15 narrow MWD polystyrene (PS) standards in the range of 1 kg/mol to 12 000 kg/mol. Mark Houwink constants for PS, PE and PP used are as per ASTM D 6474-99. All samples were prepared by dissolving 0.5-4.0 mg of polymer in 4 mL (at 140° C.) of stabilized. TCB (same as mobile phase) and keeping for max. 3 hours at max. 160° C. with continuous gentle shaking prior sampling into the GPC instrument.

Determination of Xylene Soluble Fraction (XS):

The xylene soluble fraction (XS) as defined and described in the present invention is determined in line with ISO 16152 as follows: 2.0 g of the polymer were dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (percent) can then be determined as follows:

$$XS\ \%=(100\times m1\times v0)/(m0\times v1),$$

wherein m0 designates the initial polymer amount (grams), m1 defines the weight of residue (grams), v0 defines the initial volume (milliliter) and v1 defines the volume of the analysed sample (milliliter).

Ethylene Content (FTIR C2)

Ethylene content was measured with Fourier transform infrared spectroscopy (FTIR) calibrated to results obtained by 13C NMR spectroscopy using a method which accounts for regio-irregular propene insertion. When measuring the ethylene content in polypropylene, a thin film of the sample (thickness about 0.220 to 0.250 mm) was prepared by hotpressing at 230° C. (preheat 5 min., press 1 min., cooling (cold water) 5 min.) using a Graseby Specac press. The FTIR spectra of the sample was recorded immediately with Nicolet Protégé 460 spectrometer from 4000 to 400 cm-1, resolution 4 cm-1, scans 64. The area of absorption peak at 733 cm-1 (baseline from 700 cm-1 to 760 cm-1) and height of reference peak at 809 cm-1 (baseline from 780 cm-1 to 880 cm-1) were evaluated. The result was calculated using the following formula $$Etot=a\times A/R+b$$

where

A=area of absorption peak at 733 cm-1

R=height of reference peak at 809 cm-1

Etot=C2 content (wt.-%)

a, b are calibration constants determined by correlation of multiple calibration standards of know ethylene content as determined by 13C NMR spectroscopy to A/R.

The result was reported as an average of two measurements.

Glass Transition Temperatures—DMTA

The dynamic-mechanical analysis (DMTA) data are obtained according to ISO 6721-1 (General principles) & 6721-7 (Torsional vibration—Non-resonance method).

Experimental Setup:

A Rheometric scientific ARES rheometer, equipped with a liquid nitrogen unit and an oven (convection and radiation heating), a standard torsion rectangular tool and a software orchestrator V6.5.8, or Anton Paar MCR301 rheometer with a TC30 temperature control unit combined with a liquid nitrogen unit and an CTD600 oven (convection and radiation heating) a standard torsion rectangular tool and a software RHEOPLUS/32 v3.40 are used.

Sample Preparation

Stabilized dry pellets are compression molded at 210° C. (gel time 5 min, pressure time 25 bar/3 min, cooling rate 25 bar/15 K/min, de-molding temperature 40° C.) in a 100*100*1 mm mould. Only from homogeneous, bubble free plates are punched to 40×10×1 mm$^3$ stripes and are conditioned at least 96 hours at room temperature.

Conducting the Experiment:

The device is cooled with the clamped sample to the initial temperature (standard −130° C.). After 5 min delay time the experiment is started with a test frequency of 1 Hz, a heating rate of 2 K/min and a strain γ of 0.1%. The measurements are carried out under inert atmosphere (nitrogen) and a tension (vertically) force of 50 g(+/−20 g).

Temperature dependence of storage modulus G', loss modulus G", and loss angle tangent tan(δ) are used for evaluations.

Determinations of transition sections (e.g. glass transition temperature, Tg) is based on the loss tangent tan(δ) vs. temperature curve (peak of the curve).

Charpy Notched Impact Strength

Charpy impact strength was determined according to ISO 179-1eA:2000 on V-notched samples of 80×10×4 mm$^3$ at 23° C. (Charpy impact strength (23° C.)) and −20° C. (Charpy impact strength (−19° C.)). A standard impact velocity of 2.9 m/s was used.

The test specimens having a dimension of 80×10×4 mm$^3$ were cut from the central part of ISO multibar specimens prepared by injection moulding in line with ISO 1873-2.

Brittle-to-Ductile Transition Temperature

The determination of the brittle-to-ductile transition temperature (BDTT) is based on the a(cN) values as determined from Charpy instrumented impact strength according to ISO 179-2:2000 on V-notched specimen with a geometry of 80×10×4 mm3 as required in ISO 179-1 eA.

The a(cN) values are determined in intervals of 3° C. from −40° C. to +41° C. with an impact velocity of 1.5 m/s and plotted over temperature, calculating the BDTT as the average value of the step increase. For a detailed description of the determination of the BDTT reference is made to Grein, C. et al, Impact Modified Isotactic Polypropylene with Controlled Rubber Intrinsic Viscosities: Some New Aspects About Morphology and Fracture, J Appl Polymer Sci, 87 (2003), 1702-1712.

Tensile Modulus

Tensile properties were determined according to ISO 527-2 (cross head speed=50 mm/min; 23° C.) using injection moulded specimens as described in EN ISO 1873-2 (ISO multibar, dog bone shape, 4 mm thickness).

Prepolymerisation Degree

Calculated as weight of polymer matrix/weight of solid catalyst before prepolymerisation step.

The invention will now be described with reference to the following non limiting examples.

EXAMPLES

Catalyst Preparation:

The catalysts used have been prepared following the general procedures described in WO2013/007650 to prepare catalyst E2P, using the same metallocene complex (E2 in WO2013/007650) rac-anti-dimethylsilanediyl(2-methyl-4-(4'-tert-butylphenyl)inden-1-yl)(2-methyl-4-phenyl-5-methoxy-6-tert-butylinden-1-yl) zirconium dichloride (MC1) (catalyst 1 and 2) or related metallocene racemic anti-dimethylsilanediyl[2-methyl-4-(4-tert-butylphenyl)-inden-1-yl] [2-methyl-4-(4-tert-butylphenyl)-5-methoxy-6-tert-butyl-inden-1-yl]zirconium dichloride (MC2) (catalyst 3).

Their composition is indicated below: Table 1

| Catalyst | Al/Zr (molar ratio) in unprepped catalyst Mol/mol | Degree of prepping w/w | MC in prepped cat # |
|---|---|---|---|
| 1 | 242 | 3.2 | 1.24 |
| 2 | 250 | 3.5 | 1.12 |
| 3 | 440 | 3.4 | 0.65 |

The procedures are described in detail below:

Catalyst 1

Catalyst synthesis: Inside the glovebox, 80.0 µl of dry and degassed FluorN 474 were mixed with 2 mL of MAO in a septum bottle and left to react overnight. The following day, 58.7 mg of the metallocene (0.076 mmol, 1 equivalent) were dissolved with 4 mL of the MAO solution in another septum bottle and left to stir inside the glovebox. After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.60 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1,3-dimethylcyclohexane (15 cm$^3$) and 557.3 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (14 min.) sufficient to provide the desired degree of polymerisation (DP=3.2). The reaction was stopped by flashing the volatile components. Inside the glove box, the reactor was opened and the content poured into a glass vessel. The perfluoro-1,3-dimethylcyclohexane was evaporated until a constant weight was obtained to yield 2.33 g of the pre-polymerised catalyst.

Catalyst 2

Catalyst synthesis: Inside the glovebox, 80.0 µl of dry and degassed FluorN 474 were mixed with 2 mL of MAO in a septum bottle and left to react overnight. The following day, 58.7 mg of the metallocene (0.076 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.81 g of a red solid catalyst was obtained.

Catalyst off-line prepolymerization (Prepping): The above catalyst was pre-polymerised according to the following procedure: Off-line pre-polymerisation experiment was done in a 125 mL pressure reactor equipped with gas-feeding lines and an overhead stirrer. Dry and degassed perfluoro-1,3-dimethylcyclohexane (15 cm³) and 801.7 mg of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The propylene feed was left open and the monomer consumption was compensated by keeping the total pressure in the reactor constant (about 5 barg). The experiment was continued until a polymerisation time (17 min.) sufficient to provide the desired degree of polymerisation (DP=3.5). The reaction was stopped by flashing the volatile components. Inside the glove box, the reactor was opened and the content poured into a glass vessel. The perfluoro-1,3-dimethylcyclohexane was evaporated until a constant weight was obtained to yield 3.59 g of the pre-polymerised catalyst.

Catalyst Complex 3:

As metallocene complex was used the racemic anti-dimethylsilanediyl[2-methyl-4-(4-tert-butylphenyl)-inden-1-yl] [2-methyl-4-(4-tert-butylphenyl)-5-methoxy-6-tert-butyl-inden-1-yl]zirconium dichloride (MC2) according to the following formula

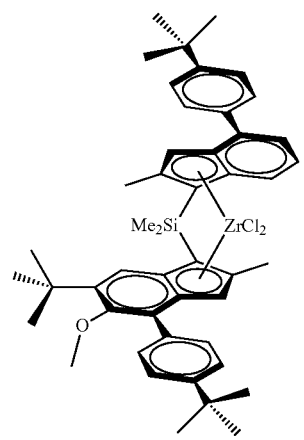

Synthesis of racemic anti-dimethylsilanediyl[2-methyl-4-(4-tert-butylphenyl)-inden-1-yl] [2-methyl-4-(4-tert-butylphenyl)-5-methoxy-6-tert-butyl-inden-1-yl]zirconium dichloride can be found in WO2013/007650.

Catalyst Preparation:

Inside the glovebox, 54 µL of dry and degassed mixture of perfluoroalkylethyl acrylate ester (used as surfactant) were mixed with 2 mL of MAO in a septum bottle and left to react overnight. The following day, 44.50 mg of metallocene MC1 (0.051 mmol, 1 equivalent) were dissolved with 4 mL of the MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 1.0 g of a red solid catalyst was obtained.

Off-line pre-activation procedure: The catalyst as prepared above (MC1-Cat) was pre-polymerised according to the following procedure Off-line pre-polymerisation experiments were done in a 125 mL pressure reactor equipped with gas-feeding lines and an overhead stirrer. Dry and degassed perfluoro-1,3-dimethylcyclohexane (PFC)(15 ml) and the desired amount of the catalyst MC1-Cat (604.6 mg) to be pre-polymerised were loaded into the reactor inside a glove box and the reactor was sealed. The reactor was then taken out from the glove box and placed inside a water cooled bath kept at 25° C. The overhead stirrer and the feeding lines were then connected. The experiment was started by opening the propylene feed into the reactor and setting the stirrer speed at 450 rpm. The propylene feed was left open and the monomer consumption was compensated by keeping the total pressure in the reactor constant (about 5 barg). The experiment was continued for the polymerisation time (17.5 min) sufficient to provide the desired degree of polymerisation (DP). The reactor was then taken back inside the glove box before opening and the content was poured into a glass vessel. PFC was evaporated until a constant weight was obtained to yield 2.90 g of the pre-polymerised catalyst. The degree of polymerisation (DP) was determined gravimetrically and/or by analysis of the ash and/or aluminium content of the catalyst. Pre-polymerization degree is 3.8 g(PP)/g(cat). Prepolymerised MC2-Cat is marked as PMC2-Cat.

The catalyst (X) used in CE3 was prepared as described in example 10 of WO2010/052263.

Polymerization Examples: Bulk Propylene Homopolymerization Followed by Gas Phase Ethylene/propylene Copolymerization The heterophasic compositions have been prepared by means of a 3-step polymerization (bulk homopolymerisation+gas phase (GP1) homopolymerisation+gas phase (GP2) C2/C3 copolymerisation) in a 20-L reactor, as described below.

Step1: Bulk Propylene Homopolymerization

A stirred autoclave (double helix stirrer) with a volume of 21.2 dm$^3$ containing 0.2 bar-g propylene, was filled with additional 3.97 kg propylene plus the amount of H2 indicated in the table. After adding 0.73 mmol triethylaluminium (Aldrich, 1 molar solution in n-hexane) using a stream of 250 g propylene, the solution was stirred at 20° C. and 250 rpm for 20 min. Then the catalyst was injected as described in the following. The solid, pre-polymerized catalyst (type, amount and degree of polymerisation as listed in the tables) was loaded into a 5-mL stainless steel vial inside the glovebox, the vial was attached to the autoclave, then a second 5-mL vial containing 4 ml n-hexane and pressurized with 10 bars of N2 was added on top, the valve between the two vials was opened and the solid catalyst was contacted with hexane under N2 pressure for 2 s, then flushed into the reactor with 250 g propylene. Stirring speed was increased to 250 rpm and pre-polymerisation was run for 10 min at 20° C. At the end of the prepolymerization step, the stirring speed was increased to 350 rpm and the polymerisation temperature increased to 80° C. When the internal reactor temperature reached 71° C., the amount of H2 indicated in the table was added with a defined flow via thermal mass flow controller. The reactor temperature was held constant throughout the polymerization. The polymerization time was measured starting when the temperature was 2° C. below the set polymerization temperature.

Step 2: Gas Phase: propylene homopolymerization (GP1)

After the bulk step was finished, the stirrer speed was adjusted to 50 rpm and the reactor pressure was reduced to 0.5 bar below the set pressure by venting. Then the stirrer speed was set to 250 rpm, the reactor temperature to 80° C. and the amount of H2 indicated in the table was dosed via MFC. Then the reactor P and T were held constant by propylene feed via MFC until the target split had been reached.

Step 3: Gas Phase: ethylene/propylene copolymerization (GP2)

When the GP 1 had been finished, the stirrer speed was reduced to 50 rpm. The reactor pressure was lowered to 0.3 barg by venting, the temperature and control device was set to 70° C. Then the reactor was filled with 200 g propylene at a flow of 70 g/min and flushed again to 0.3 barg.

Afterwards the stirrer speed was adjusted to 250 rpm. Then the reactor was filled with the chosen C3/C2 monomer ratio (transition feed, see table). The speed of the reactor filling during the transition was limited by the max. flow of the gas flow controllers. When the reactor temperature reached 69° C. and the reactor pressure reached the set value, the composition of the fed C3/C2 mixture was changed to the target copolymer composition and temperature and pressure were held constant until the amount of C3/C2 gas mixture required to reach the target rubber split had been consumed.

The reaction was stopped by setting the stirrer speed to 20 rpm, cooling the reactor to 30° C. and flashing the volatile components.

After flushing the reactor twice with N2 and one vacuum/N2 cycle, the product was taken out and dried overnight in a fume hood. 100 g of the polymer was additivated with 0.2 wt % Ionol and 0.1 wt % PEPQ (dissolved in acetone) and then dried overnight in a hood plus 2 hours in a vacuum drying oven at 60° C.

Further polymerisation data and results are presented in the tables which follow.

TABLE 2

| Example | catalyst | prepolymerized prep degree w/w | catalyst amount mg | cat. diluent Type | diluent amount ml | TEA1 (1 molar) ml | PREPOLY T °C. | res. time min | H2 NL | BULK STEP temp. av. bulk °C. | total H2 NL |
|---|---|---|---|---|---|---|---|---|---|---|---|
| Ex1 | 2 | 3.5 | 203 | * | 4 | 0.73 | 20 | 10 | 0.0 | 80 | 4 |
| Ex2 | 3 | 3.8 | 154 | * | 4 | 0.73 | 20 | 10 | 0.0 | 80 | 5 |
| CE1 | 1 | 3.2 | 175 | * | 4 | 0.73 | 20 | 10 | 0.0 | 80 | 4 |
| CE2 | 2 | 3.5 | 200 | * | 4 | 0.73 | 20 | 10 | 0.0 | 80 | 4 |
| CE3 | X | 3.1 | 261 | * | 4 | 0.73 | 20 | 10 | 0.4 | 80 | 2 |
| CE4 | 3 | 3.8 | 148 | * | 4 | 0.73 | 20 | 10 | 0.4 | 80 | 2 |

| | BULK STEP | | GP1 (homopolymerisation) | | | | | GP C3H6 feed | GP(C2/C3) | | |
| | H2 dosing | res. | | | | H2-dosing | | | | | |
| Example | rate NL/min | time min | Temp. °C. | Ptotal Bar-g | H2 NL | rate ln/min | time min | (MFC) g | Temp GP °C. | Ptotal Barg | H2 NL |
|---|---|---|---|---|---|---|---|---|---|---|---|
| Ex1 | 1.8 | 30 | 80 | 36 | 3.5 | 1.8 | 20 | 4435 | 80 | 34.1 | 1.100 |
| Ex2 | 1.8 | 20 | 80 | 36 | 3.0 | 1.8 | 20 | 4421 | 80 | 25 | 1.100 |
| CE1 | 1.8 | 30 | 80 | 36 | 3.5 | 1.8 | 20 | 4438 | 80 | 29.8 | 1.480 |
| CE2 | 1.8 | 30 | 80 | 36 | 3.5 | 1.8 | 20 | 4432 | 80 | 25 | 1.100 |

TABLE 2-continued

| | | | | | | | | | | | |
|---|---|---|---|---|---|---|---|---|---|---|---|
| CE3 | 0.116 | 30 | 80 | 36 | 2.00 | 1.8 | 30 | 4424 | 80 | 299 | 0.317 |
| CE4 | 0.116 | 30 | 80 | 36 | 3.0 | 1.8 | 20 | 4421 | 80 | 25 | 1.100 |

| | | GP(C2/C3) | | | | | | |
|---|---|---|---|---|---|---|---|---|
| | | C3H6-feed | C2H4-feed | | | | YIELD, MFR | |
| Example | res. time Min | transition (MFC) G | transition (MFC) g | C2/C3 wt during transition | GP-C3H6 feed (MFC) g | GP-C2H4 feed (MFC) g | feed C2/C3 wt | yield total g | MFR (2.16) g/10 min |
| Ex1 | 20.5 | 33 | 418 | 12.90 | 100 | 396 | 3.96 | 470 | 3 |
| Ex2 | 74 | 34 | 404 | 11.76 | 86 | 319 | 3.71 | 413 | 10.0 |
| CE1 | 42 | 83 | 501 | 5.99 | 220 | 366 | 1.66 | 645 | 5.7 |
| CE2 | 47.17 | 14 | 411 | 29.03 | 31 | 285 | 9.19 | | 7 |
| CE3 | 66 | 53 | 396 | 7.50 | 111 | 326 | 2.94 | 416 | 13.3 |
| CE4 | 71 | 85 | 375 | 4.41 | 171 | 256 | 1.50 | 432 | 9.8 |

TABLE 3

| | split bulk % | split gp1 % | split gp2 % |
|---|---|---|---|
| EX1 | 38 | 32 | 31 |
| EX2 | 39 | 33 | 29 |
| CE1 | 37 | 31 | 32 |
| CE2 | 47 | 30 | 23 |
| CE3 | 40 | 32 | 28 |
| CE4 | 36 | 33 | 30 |

Results are presented in tables 4 to 7. CE5 results are obtained through repetition of example E1 of WO2009/077034

TABLE 4

| Example | MFR (Matrix) g/10 min | MFR (total) g/10 min | IV (XI) dl/g | IV (XS) dl/g | IV ratio | XS wt % | C2 (XS) wt % | C2 (total) wt % | C2 (XI) wt % | Mw (XS) | Mn (XS) | PDI (XS) |
|---|---|---|---|---|---|---|---|---|---|---|---|---|
| EX1 | 35 | 3 | 1.64 | 3.46 | 2.11 | 29.2 | 79.3 | 23.3 | 0.0 | 290000 | 122000 | 2.4 |
| EX2 | 35 | 10 | 1.64 | 3.82 | 2.33 | 29.2 | 77.7 | 22.8 | 0.0 | | | |
| CE1 | 35 | 5.7 | 1.64 | 2.65 | 1.62 | 35.5 | 68.4 | 24.5 | 0.0 | | | |
| CE2 | 35 | 7 | 1.64 | 0.91 | 0.55 | 2.6 | n.d. | 23.1 | 0.0 | | | |
| CE3 | 35 | 13.3 | 1.64 | 1.20 | 0.73 | 26.5 | 81.0 | 21.4 | 0.0 | | | |
| CE4 | 35 | 9.8 | 1.64 | 2.33 | 1.42 | 30.8 | 56.6 | 17.8 | 0.0 | | | |
| CE5 | 68 | 19 | 1.3 | 3.4 | 2.62 | 16.6 | 74.9 | | | | | |

TABLE 5

Mechanical properties

| | BDT/° C. | NIS/kJ/m² | | | |
|---|---|---|---|---|---|
| | $T_{peak}$ | −20° C. | type of failure | 23° C. | type of failure |
| Ex. 1 | −6 | 8.4 | C | 77.5 | P |
| Ex. 2 | −1 | 8.5 | C | 66.8 | P |
| CE. 1 | 5 | 9.7 | C | 48.9 | P |
| CE. 2 | 36 | 3.5 | C | 8.4 | C |
| CE. 3 | n.a. | 2.0 | C | 8.8 | C |
| CE. 4 | 14 | 8.1 | C | 52.6 | P |

TABLE 6

| | Tensile Modulus MPa | Elongation @ break/% | $T_g$(EPR)/ ° C. | $T_g$(PP)/ ° C. | G'@23° C./ MPa |
|---|---|---|---|---|---|
| Ex. 1 | 962 | 376 | −35.4 | 1.6 | 320 |
| Ex. 2 | 1105 | 419 | −37.6 | 2.2 | 339 |

TABLE 6-continued

| | Tensile Modulus MPa | Elongation @ break/% | $T_g$(EPR)/ ° C. | $T_g$(PP)/ ° C. | G'@23° C./ MPa |
|---|---|---|---|---|---|
| CE. 1 | 963 | 234 | −52.0 | 2.0 | 530 |
| CE. 2 | 1196 | 384 | −120.0 | 3.1 | 488 |
| CE. 3 | 1132 | 336 | −46.5 | 2.8 | 451 |
| CE. 4 | 1091 | 321 | −51.4 | 2.6 | 368 |

TABLE 7

DSC/Total

| | $T_{m1}$/° C. | $T_{m2}$/° C. | $\Delta H_{m1}$/J/g | $\Delta H_{m2}$/J/g | $T_{c1}$/° C. | $T_{c2}$/° C. |
|---|---|---|---|---|---|---|
| Ex. 1 | 64.3 | 148.8 | 23.4 | 67.8 | 48.0 | 109.5 |
| Ex. 2 | 60.6 | 149.7 | 16.5 | 68.0 | 44.8 | 109.4 |
| CE. 1 | 34.6 | 148.7 | 3.0 | 63.4 | | 112.5 |
| CE. 2 | 85.9 | 148.7 | 38.7 | 122.8 | 70.0 | 111.8 |
| CE. 3 | 51.0 | 150.0 | 6.8 | 66.0 | | 114.7 |
| CE. 4 | n.d. | 149.9 | n.d. | 67.8 | n.d. | 110.8 |
| CE. 5 | | 157 | | | | |

Melting point Tm1/ΔHm1/Tc1 represent the values for the PE component and Melting point Tm2/ΔHm2/Tc2 represent the values for the PP component.

The invention claimed is:
1. A heterophasic propylene ethylene copolymer having an $MFR_2$ of 0.5 to 100 g/10 min and obtained using single site catalysis comprising:
   (i) a propylene homopolymer or propylene ethylene copolymer matrix having up to 4 wt % ethylene; and
   (ii) an ethylene propylene rubber (EPR) dispersed in the matrix;

said heterophasic propylene ethylene copolymer having a xylene cold soluble content (XS) of 20 to 40%;

wherein the ethylene content of the xylene cold soluble fraction of said heterophasic propylene ethylene copolymer is between 70 and 90 wt. %;

wherein the xylene cold soluble fraction of said heterophasic propylene ethylene copolymer has an intrinsic viscosity (IV) of 3.0 dl/g or more; and wherein the melting enthalpy (ΔHm) of the heterophasic propylene ethylene copolymer is between 10 and 30 J/g at a temperature of 0 to 130° C.

2. A heterophasic copolymer as claimed in claim 1 which is formed in three steps.

3. A heterophasic copolymer as claimed in claim 1 wherein the matrix component is a homopolymer.

4. A heterophasic copolymer as claimed in claim 1 wherein there is 20 to 35 wt % XS component.

5. A heterophasic copolymer as claimed in claim 1 having an $MFR_2$ of 0.7 to 60 g/10 min.

6. A heterophasic copolymer as claimed in claim 1 wherein the C2(XS) content is 71 to 90 wt %.

7. A heterophasic copolymer as claimed in claim 1 wherein the IV(XS) is in the range of 3.0 to 4.0 dl/g.

8. A heterophasic copolymer as claimed in claim 1 wherein the charpy impact strength is at least 50 kJ/m$^2$ at 23° C.

9. A heterophasic copolymer as claimed in claim 1 wherein the brittle to ductile transition temperature occurs at 0° C. or less.

10. A heterophasic copolymer as claimed in claim 1 having at least two melting points.

11. A heterophasic copolymer as claimed in claim 1 wherein the glass transition temperature of the xylene soluble fraction is −30 to −45° C.

12. A process for the preparation of a heterophasic propylene ethylene copolymer as claimed in claim 1 comprising polymerising:
(I) propylene and optionally ethylene so as to form a propylene homopolymer or propylene ethylene copolymer matrix having up to 4 wt % ethylene as said matrix component; and subsequently polymerising
(II) propylene and ethylene so as to form an ethylene propylene rubber dispersed in the matrix;
wherein both steps (I) and (II) take place in the presence of the same single site solid particulate catalyst free from an external carrier comprising (i) a complex of formula (I):

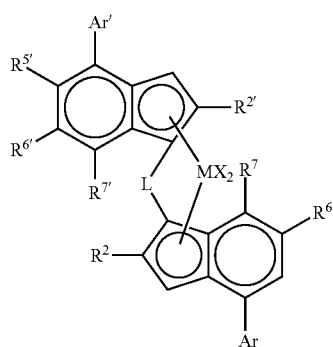

(I)

wherein

M is zirconium or hafnium;

each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$ hydrocarbyl radical optionally containing one or more heteroatoms from groups 14-16;

$R^{5'}$ is a $C_{1-20}$ hydrocarbyl group containing one or more heteroatoms from groups 14-16 optionally substituted by one or more halo atoms;

$R^6$ and $R^{6'}$ are each independently hydrogen or a $C_{1-20}$ hydrocarbyl group optionally containing one or more heteroatoms from groups 14-16;

$R^7$ and $R^{7'}$ are each independently hydrogen or $C_{1-20}$ hydrocarbyl group optionally containing one or more heteroatoms from groups 14-16;

Ar is independently an aryl or heteroaryl group having up to 20 carbon atoms optionally substituted by one or more groups $R^1$;

Ar' is independently an aryl or heteroaryl group having up to 20 carbon atoms optionally substituted by one or more groups $R^1$;

each $R^1$ is a $C_{1-20}$ hydrocarbyl group or two $R^1$ groups on adjacent carbon atoms taken together can form a fused 5 or 6 membered non aromatic ring with the Ar group, said ring being itself optionally substituted with one or more groups $R^4$;

each $R^4$ is a $C_{1-20}$ hydrocarbyl group;

and (ii) a cocatalyst comprising a compound of a group 13 metal.

13. A process for the preparation of a propylene ethylene copolymer as claimed in claim 12 in which the catalyst is prepared by obtaining a complex of formula (I) and a cocatalyst (ii);

forming a liquid/liquid emulsion system, which comprises a solution of catalyst components (i) and (ii) dispersed in a solvent, and solidifying said dispersed droplets to form solid particles.

14. An article comprising the heterophasic propylene ethylene copolymer as claimed in claim 1.

15. The process of claim 12, wherein in step (II) propylene and ethylene are polymerised in the gas phase.

16. The process of claim 12, wherein the group 13 metal is an aluminium compound or a boron compound.

17. The article of claim 14, wherein the article comprises a film.

* * * * *